United States Patent Office 3,050,229
Patented Aug. 21, 1962

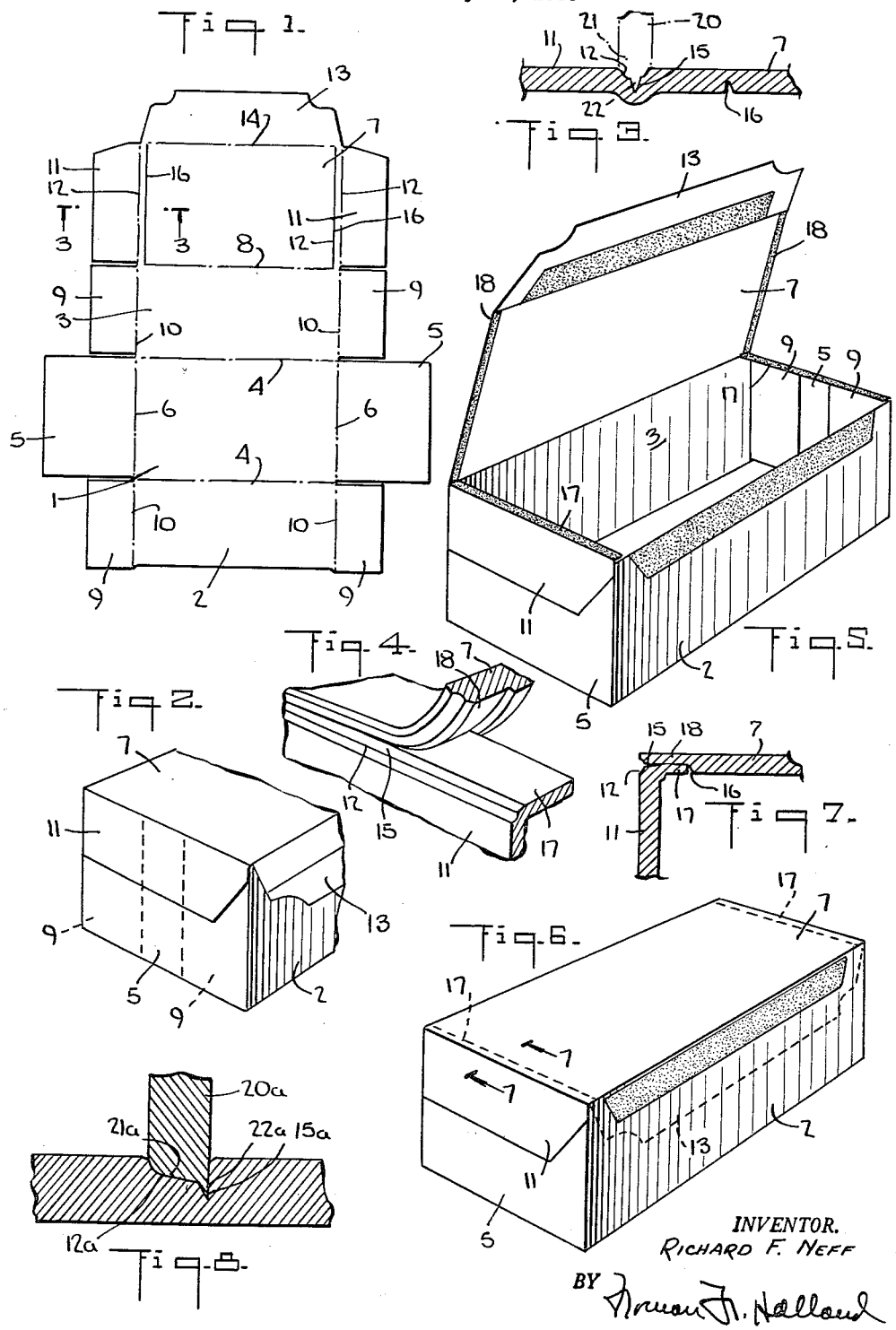

3,050,229
CONTAINER AND METHOD AND MEANS FOR MAKING SAME
Richard F. Neff, Manhasset, N.Y., assignor, by mesne assignments, to The Lord Baltimore Press, Incorporated, New York, N.Y., a corporation of Maryland
Filed July 24, 1959, Ser. No. 829,341
1 Claim. (Cl. 229—16)

The present invention relates to a container, and, more particularly, to an improved container for storing frozen foods, such as ice cream and the like.

Ice cream is often manufactured and packaged in large lots for reasons of manufacturing economy and it sometimes happens that the packages remain in storage freezers for a considerable length of time. Therefore, it is essential to minimize flavor loss and fat separation during such storage periods.

At present many such containers employ tuck flaps which are locked together in the carton sealing operation. Of necessity such cartons are not air-tight and they permit flavor loss and fat separation so that the shelf life of the containers is usually rather short, i.e., between 60 and 90 days. Relatively air-tight containers have also been used for packaging ice cream, but such containers are difficult to open and have therefore been found to be impractical.

It has also been found that the tuck flaps of the locked cartons are usually torn when the ice cream is removed making it difficult to reclose these packages for further use.

The present invention eliminates these disadvantages and provides a novel improved ice cream container which is air-tight to prolong its shelf life for relatively long periods with negligible fat separation or flavor loss.

Another object of the present invention is to provide an improved air-tight container which can be easily opened.

Another object of the present invention is to provide an improved container which can be reclosed in a relatively air-tight condition.

A further object of the present invention is to provide an improved container which is simple and inexpensive to manufacture and which can be easily formed from a single carton blank.

Another object of the present invention is to provide an improved method and means for making a reclosable airtight container.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is an elevational view showing a container blank made in accordance with the present invention;

FIG. 2 is a perspective view showing the container blank assembled into a container;

FIG. 3 is a sectional view taken on line 3—3 of FIG. 1 showing a feature of the present invention and showing a method of forming the container;

FIG. 4 is an enlarged perspective view showing the opening operation of the present container;

FIG. 5 is a perspective view showing the container in its fully opened position;

FIG. 6 is a perspective view showing the container in its reclosed position;

FIG. 7 is a sectional view taken along line 7—7 of FIG. 6 showing the means for maintaining the container in a relatively airtight condition after it has been initially opened; and FIG. 8 is a sectional view showing another method of forming the container.

Referring more particularly to FIG. 1, the container comprises the usual bottom panel 1, front and rear panels 2 and 3 hinged to the bottom panel 1 along edges 4 thereof, side panels 5 hinged to the bottom panel 1 along the other edges 6, and a top panel 7 hinged to the rear panel 3 along edge 8 thereof.

The front and rear panels 2 and 3 are provided with end flaps 9 hinged thereto along edges 10 which are adapted to be secured to the side panels 5 when the blank is assembled into a carton. The top panel 7 is provided with end flaps 11 hinged thereto along fold line 12 and a front tab 13 hinged thereto along edge 14. The blank is preferably made of paperboard which has a coating thereon of a polyethelene substance to make the carton relatively impervious.

The blank is assembled into the carton shown in FIG. 2 by bending the front and rear panels 2 and 3 along the fold lines 4 and by securing the end flaps 9 of the front and rear panels to the side panels 5. The top panel 7 is then bent over the carton, and its end flaps 11 thereon are secured to the outside of the side panels 5. The front tab 13 is then secured to the front of the front panel 2, as shown in FIG. 2 to complete the container. Preferably, the various panels and flaps are secured to each other by an impervious adhesive so that the carton is airtight.

With this arrangement the airtight carton can be stored for long periods of time with negligible flavor loss or fat separation and are capable of having a shelf life of a year or more.

The improved means for permitting the carton to be easily opened when it is to be used is shown more particularly in FIGS. 3, 4 and 5. The opening means comprise a tear guide or partial cut line 15 formed on one side of the top panel 7 and a second tear guide or partial cut line 16 formed on the other side of the top panel 7 in spaced relation to the first partial cut line 15. Preferably the partial cut line 15 is located at the scored fold line 12 which joins the cover portion 6 to the end flaps 8. With this arrangement, when the carton is to be opened, the tab 13 is pulled away from the front panel 2. Further lifting of the tab 13 will tear the cover portion 6 along a horizontal portion connecting the partial cut lines 15 and 16 as shown in FIG 4. Continued lifting of the tab 13 will completely separate the cover from the flaps 11, leaving an inwardly extending flange 17 and leaving an end zone of reduced thickness 18 on each edge of the cover portion. Hence, it will be seen that the container may be manufactured in an airtight condition and at the same time may be easily opened by merely pulling the tab 13.

When a portion of the contents of the container has been removed therefrom and it is desired to reclose the container for further storage, the top panel 7 is lowered and the tab 13 is tucked within the body of the container behind the front panel 2 as shown in FIG 6. At the same time the inwardly extending flanges 17 and the zones of reduced thickness 18 on the panel 7 will cooperate, as shown in FIG. 7, to form a seal which will maintain the container in a relatively air-tight condition to prolong its storage life even after the container has been initially opened.

It will be seen, therefore, that the present container has a longer shelf life with negligible flavor loss or fat separation not only after it has been initially sealed by the packer but even after the container has been initially opened and reclosed for further use.

The present invention also provides an improved method and means for forming the partial cut 15 at the scored fold line 12. One embodiment is shown in dotted lines in FIG. 3 where a combined scoring rule and cutting knife 20 comprises a semi-circular rounded portion 21 and a cutting edge 22 located centrally thereof. The rounded portion 21 is adapted to form the scored fold line 12 and the cutting portion 22 is simultaneously adapted to form the partial cut 15 located centrally of the fold line 12. The forming of the score line 12 and the partial cut line 15 simultaneously permits the blank to be formed in a single operation and eliminates the necessity of first forming a score line and thereafter forming a cut line at the scored fold line and hence will increase speed and reduce costs.

A modified form of combined cutting knife and scoring rule is shown in FIG. 8 at 20a in which a cutting edge 22a is located along one side of the rounded edge 21a. The score line 12a formed with this tool will have the partial cut line 15a along one side thereof rather than centrally as used in the embodiment shown in FIG. 3.

It will be seen from the above that the present invention provides an improved air-tight container for ice cream which has a longer shelf life and which can be easily opened. The present invention also provides a container which can be easily and tightly reclosed for further storage in a relatively air-tight condition. The present invention further provides a simple and inexpensive means and method for forming the container of the present invention in a single operation.

As various changes may be made in the form, construction and arrangement of the parts herein without departing from the spirit and scope of the invention and without sacrificing any of its advantages, it is to be interpreted as illustrative and not in a limiting sense.

Having thus described my invention, I claim:

A one-piece container comprising a bottom panel having front, rear and end panels hinged thereto along fold lines, the front and rear panels having end flaps extending therefrom folded along fold lines and tightly secured to said end panels, a top panel extending from said rear panel and hingedly connected thereto along a fold line, said top panel having end flaps extending therefrom and folded substantially at right angles to said top panel along fold lines and tightly secured to said end panels, a front tab hingedly extending from said top panel along a fold line and releasably secured to said front panel, an outer partial cut line coinciding with the fold line in each corner formed by said top panel and each of said end flaps, an inner partial cut line on the lower face of said top panel spaced inwardly from each of said upper partial cut lines and parallel thereto and terminating at the fold line of said front tab, the front edge of the top panel between said partial cut lines being unattached to the front panel whereby the top panel will tear along a portion joining said partial cut lines when the front tab is pulled to open the carton thereby leaving an inwardly directed flange which will cooperate with the top panel in reclosing of the container to form a relatively air-tight seal therewith.

References Cited in the file of this patent

UNITED STATES PATENTS

| | | |
|---|---|---|
| 1,931,991 | Mergentheim | Oct. 24, 1933 |
| 2,114,134 | Weiss | Apr. 12, 1938 |
| 2,114,948 | Wehner | Apr. 19, 1938 |
| 2,124,868 | Davidson | July 26, 1938 |
| 2,186,973 | Hothersall | Jan. 16, 1940 |
| 2,557,914 | Miller | June 19, 1951 |
| 2,651,450 | Ellsworth | Sept. 8, 1953 |
| 2,765,716 | Anderson | Oct. 9, 1956 |
| 2,953,293 | Anderson | Sept. 20, 1960 |

FOREIGN PATENTS

| | | |
|---|---|---|
| 240,656 | Great Britain | Oct. 8, 1925 |
| 473,018 | Great Britain | Sept. 27, 1937 |